Sept. 24, 1968   J. RIX   3,402,924
SPRINGS
Filed May 2, 1966   5 Sheets-Sheet 2

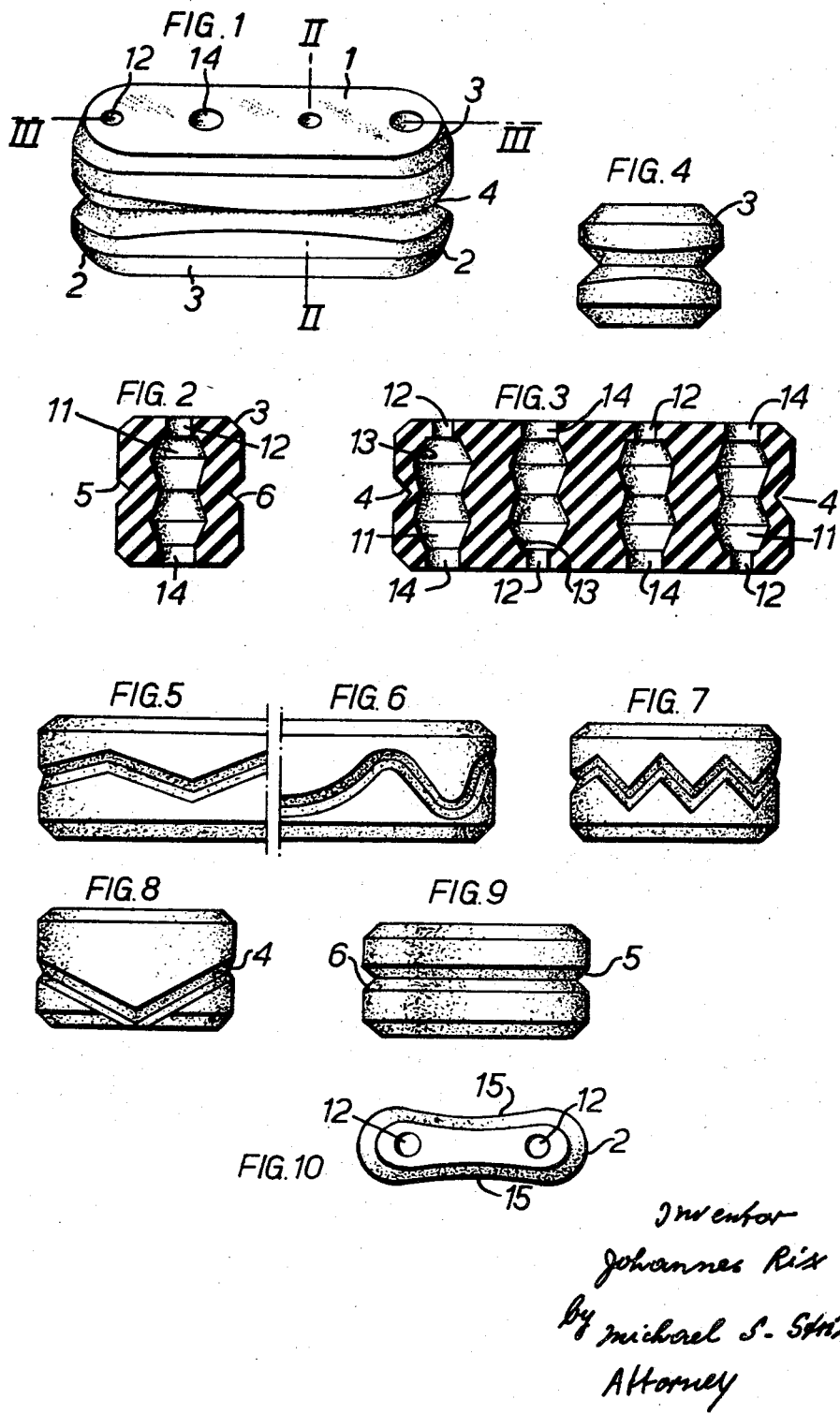

Inventor
Johannes Rix
by Michael S. Striker
Attorney

Sept. 24, 1968          J. RIX          3,402,924

SPRINGS

Filed May 2, 1966          5 Sheets-Sheet 4

Inventor
Johannes Rix
by Michael S. Striker
Attorney

Sept. 24, 1968  J. RIX  3,402,924
SPRINGS

Filed May 2, 1966  5 Sheets-Sheet 5

Inventor
Johannes Rix
by Michael S. Striker
Attorney

United States Patent Office 3,402,924
Patented Sept. 24, 1968

3,402,924
SPRINGS
Johannes Rix, Kassel, Germany, assignor to Aeon Products (London) Limited, London, England
Filed May 2, 1966, Ser. No. 546,854
Claims priority, application Great Britain, May 3, 1965, 18,515/65
17 Claims. (Cl. 267—63)

ABSTRACT OF THE DISCLOSURE

A spring for damping and absorbing shock and vibrations, the spring being in the form of an oblong body of elastomeric material and provided with a plurality of cavities spaced in direction of the elongation of the body from each other and extending transverse to opposite engaging faces of the body and each having a portion of double frusto-conical form arranged in such a manner that the conical faces defining each cavity approach each other on compression of the body.

---

The invention relates to springs for damping or absorbing shock and vibrations in vehicle suspensions or the mountings of machines and of the kind comprising a hollow body of resilient material such as natural or synthetic plastic material.

Springs of this kind, made of rubber and of oblong block-like configuration have been proposed. Such oblong springs have the advantage that they can be readily provided in restricted spaces in vehicle suspensions, for example between the axle and the chassis of the vehicle. The space available for any kind of spring element in a motor vehicle, especially having regard to limitations in track width and more particularly having regard to the space available transversely to the longitudinal axis of the vehicle, is very limited. In the longitudinal direction of the vehicle, more space is available for the provision of springs. If a rubber spring element with great loadability and of oblong configuration of the known construction is used, then considerable difficulties arise which make the use of such springs undesirable, in spite of the convenience with which they can be provided. Such oblong block-shaped rubber springs, which have essentially rectangular cross sections have an unfavourable deformation characteristic. Generally, the deformation of rubber blocks subjected to compressive loading is limited to 20% deformation from the unloaded height of the spring. At this point, the spring is compressed solid. Moreover, such a deformation has an unfavourable effect on the life of the spring, since, especially with periodic variations in loading such as occur in connection with vehicles, heat is developed which is not satisfactorily dissipated as a result of the unfavourable cross section, so that overheating and ultimate failure of the spring occurs.

It is an object of the invention to improve springs of the kind described above, so as to substantially avoid the above-mentioned disadvantages. More particularly, the invention proposes to arrange the spring in such a way that compressive loading is applied in such a manner that it is distributed over the entire cross section of the spring, whereby a substantially uniform deformation over the cross section and over the height of the spring is achieved. By means of such a uniform deformation, in spite of the unfavourable asymmetrical cross section, a high loadability and a large deformation path are achieved, while at the same time a satisfactory life duration for the spring is obtained.

Advantageously, the spring is arranged for being mounted in such a manner that a favourable transfer of forces occurring in the longitudinal direction of the vehicle, and transversely thereto, such as guiding and reaction forces and lateral forces, is obtained without substantial influencing of the deformability of the spring body, especially at the supporting surfaces, and thus without impairment of the effective spring deflection path and the loadability. For achieving a large spring path, the deformability of the spring body, that is to say the shape of the surface to be deformed relative to the surface at which compressive forces are applied and which does not participate in the deformation, is of importance. In known springs, the division of the rubber body into individual packets and the arrangement of metal plates therebetween enables favourable influencing of the form factor. This also provides a satisfactory means for mounting the springs, since the mounting can be effected by means of the metal parts which are vulcanised to the rubber body of the spring. Such spring packets have the disadvantage of a complicated construction, which makes their production expensive. Contrary thereto, the spring body of the present invention can be so formed that means for mounting it on the chassis or axle of a vehicle can directly engage the spring body. For achieving this feature, the spring body must be made in one piece and the securing means, while allowing the transmission of the guiding and lateral forces, should not impair the favourable deformation of the spring body under compressive loading. This makes it necessary for the one piece spring body to be mounted by simple fixing means.

The spring may be so arranged that the progressive spring characteristic which is inherent in rubber springs, begins with a very shallow portion. By this means, it is achieved that the overall characteristic line approximates to an exponential characteristic, so that favourable suspension relationships are achieved for the vehicle when in the empty, partly loaded and fully loaded condition. If the spring characteristic line has this form, then the vibration frequency is the same for all of these loading conditions. The gentle increase in the spring characteristic line has moreover the advantage that the spring action takes place gently and without jolts.

In the spring of the present invention, the compressive loading is applied to the spring in such a manner that it is distributed over the entire cross section of the spring and a uniform deformation over the cross section and over the height of the spring is achieved. For obtaining this, the spring may be provided with a plurality of hollow spaces which are adjacent to each other in the longitudinal direction of the spring, the spaces being of double frusto-conical form, the bases of the frusto-conical portions coinciding. Depending on the height of the spring body, a plurality of such double frusto-conical cavities may be arranged one above the other. Advantageously, the cavities are so arranged that between the individual cavities considered in the longitudinal direction of the spring, at the regions having the greatest stretch, that is to say at the regions at which the bases of the cones coincide, sufficient material is provided for ensuring stability of the spring. By this formation of the inner wall surface of the spring, a favourable deformation possibility at the inner cross section of the spring is given, so that a build up of heat is avoided. In order that the spring shall have a satisfactory deformation possibility, corresponding to its inner construction, at its external wall surface which is not subjected to pressure and which can thus freely deform, the external wall surface may be provided with one or more constrictions which may extend around the entire external periphery of the spring body.

The engagement surfaces at the ends of the spring body may be bevelled off. Under compressive loading, the wall parts which are disposed between the ends or between the ends and the constrictions, deform outwardly, this tendency being assisted by the shape of the internal cavities. In this manner, the spring body is able to deform over the entire cross section transversely to the longitudinal direction. The requirement for the material of the spring body to change its shape is sufficiently allowed for by this construction. Since the compressive loading tends to outwardly deform or bulge the wall parts disposed between the ends or between the ends and the constriction grooves, and also acts in such a manner that the constrictions which extend essentially in the longitudinal direction of the spring body approach each other with their wall portions so that these wall portions ultimately come to lie on each other, the constrictions acting as a joint or a hinge, care has to be taken that the constrictions also participate in receiving the compressive loading applied to the ends of the spring body. This can be allowed for if the constrictions at the narrow side of the spring body have a larger opening angle than at the longitudinal sides of the spring body, since due to the specific load distribution, less constriction length is available at the narrow sides than at the longitudinal sides. This can be compensated by giving the constriction different opening angles over the periphery. A further means of receiving the loading at the ends of the spring body by a deformation possibility, which specifically corresponds to the deformation at the longitudinal sides, consists in giving the constriction groove or grooves which extend around the periphery of the spring a wave-shaped form, the wave pitch being smaller at the narrow sides of the spring member than at the longitudinal sides.

By giving the constriction groove or grooves a wave-shaped or zig-zag form, the stability of the spring body is increased. This is due to the fact that under compressive loading, the wall surfaces of the constriction or constrictions engage each other. If the constrictions are wave-shaped or of zig-zag form, then when the wall surfaces of the constrictions engage with each other a wedge-like or tooth-like keying action is achieved. Accordingly, a greater stability of the spring body against lateral folding is obtained, this being of special importance if the spring path to be achieved is large, and if for achieving a large spring path the spring body is made very narrow transversely to the longitudinal axis thereof, so that it would in any case incline towards lateral flexion. As a result of the wave-shaped or zig-zag formation of the constrictions, the stiffness of the spring in the longitudinal direction, that is to say its capacity for receiving the guiding forces, braking forces and reaction forces is favourably influenced. For increasing the stiffness in the longitudinal direction while retaining the favourable deformation possibilities over the cross section, by providing constriction grooves, the longitudinally extending constriction may have a bend at the middle of each longitudinal side of the spring body, so that the constrictions extending from the ends of the spring body run obliquely towards one of the supporting surfaces of the spring body and meet at the middle of the longitudinal sides at an obtuse angle. A further means for improving the deformability of the spring body while at the same time increasing the loadability and stability consists in providing recesses in the outer walls of the longitudinal sides, instead of leaving them flat. In one favourable embodiment of an oblong spring member, the ends of the spring body have the shape of a semicircle or an oval. By an arrangement of recesses which extend substantially perpendicularly to the longitudinal extension of the spring, the deformation possibility of the surface of the lateral walls is favourably influenced, and the loadability is increased. These recesses may be so arranged that they extend from the supporting surfaces obliquely towards the middle and meet at an angle approximately in the plane of the longitudinally extending constriction or constrictions.

For enabling a favourable transmission of the forces which occur in the longitudinal direction of the vehicle and transversely thereto, without substantially influencing the loadability of the spring body, it is preferable for the compressive forces and for the longitudinal and lateral forces to be applied to the spring as a result of the spring being mounted in such a manner that one or both of the longitudinally extending end surfaces receives the forces.

Contrary to known spring elements having metal parts or plates vulcanised thereto, by applying the forces to the longitudinally extending end surfaces of the spring, a manner of mounting can be achieved in which the deformability of the spring body in the region of the upper and lower end surfaces is not substantially influenced. The adjoining surface parts can thus deform without any hindrance. Mounting of the springs is advantageously effected by means of mounting bolts having flanged heads, the bolts being inserted through the cavities so that the flanged head engages in a neck-like portion having a step. In order to enable mounting of the spring at both ends, that is to say by means of its upper and lower end surfaces, the cavities are provided with neck portions and steps for the flanges of the bolt heads in such a manner that alternate cavities considered in the longitudinal direction of the spring body serve for the mounting of the upper and lower ends of the spring, respectively. If the spring is intended only as a supplementary spring, or is permanently subjected to force, then it is sufficient if the mounting is effected by means of bolts only at one end. A satisfactory transmission of the forces can also be effected if in addition to mounting by means of bolts, one or both end surfaces of the spring have steps or the end surfaces are shaped in such a manner that they meet at the middle at an obtuse angle. These angled surfaces engage against structural parts on the chassis or axle of the vehicle, the said parts being provided with correspondingly shaped engagement surfaces, this improving the transmission of longitudinal forces.

For improving the spring characteristic line, which has a progressive nature for rubber springs, so that it begins with a very shallow portion, when the spring is to be used as a supplementary spring with mounting only at one end, the end surface which engages the vehicle, and the vehicle part against which the spring engages, may be so formed that a deformable margin is established which is the first region to deform, this taking place before deformation of the entire spring body. By this means, the spring characteristic can be given a very gentle initial section. For this purpose, an easily deformable ring may be provided, but instead of such a ring, alternatively a pyramid-shaped or frusto-conically shaped projection from the end surface of the spring may be used to provide the desired gently rising initial portion of the characteristic line, without the deformability of the remaining wall parts and thus the functional nature of the spring having regard to the spring path, loadability and stability being influenced.

For increasing the loadability and stability, the cross sectional shape of the constriction or constrictions may be varied in such manner that instead of a V-shaped constriction groove, such a shape is used in which the surfaces defining the opening angle of the constriction approach each other asymptotically under loading. Likewise, a cross sectional shape of the constriction, in which the base portion of the constriction groove is of dovetailed shape is favourable for increasing the stability, if the adjoining wall sections are of curved or flat form.

In order to make the invention clearly understood, reference will now be made to the accompanying drawings which are given by way of example and in which:

FIG. 1 is a perspective view of an oblong block-shaped rubber spring;

FIG. 2 is a cross sectional view of the spring along the line II—II in FIG. 1;

FIG. 3 is a longitudinal sectional view through the spring body along the line III—III in FIG. 1;

FIG. 4 is an elevation view of a spring body having a V-shaped constriction groove of which the opening angle is larger at the semicircularly shaped ends of the spring body than at the longitudinal sides;

FIG. 5 is a fragmentary view showing a spring body having a constriction groove which is of zig-zag shape;

FIG. 6 is a fragmentary view of a spring body having a constriction groove which is of wave shape, the wave pitch being smaller at the ends of the spring body than at the longitudinal sides;

FIG. 7 is an elevation view of a spring body having a constriction groove of zig-zag shape;

FIG. 8 is an elevation view of a spring body having a constriction groove which has a sharp discontinuity;

FIG. 9 is an elevation view of a spring body in which the side surfaces of the body have an inwardly drawn shape;

FIG. 10 is a plan view of the spring body shown in FIG. 9;

Figure 12:
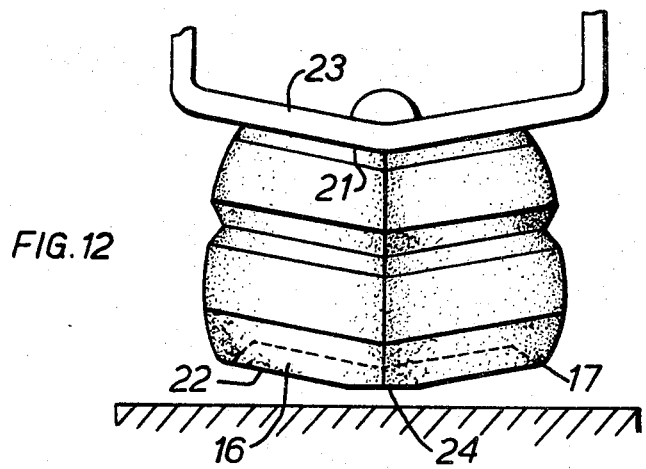
FIG. 12 is an elevation view of a spring body in which both end surfaces are shaped in such manner that the surface halves meet at the centre at an obtuse angle.
Figure 13:
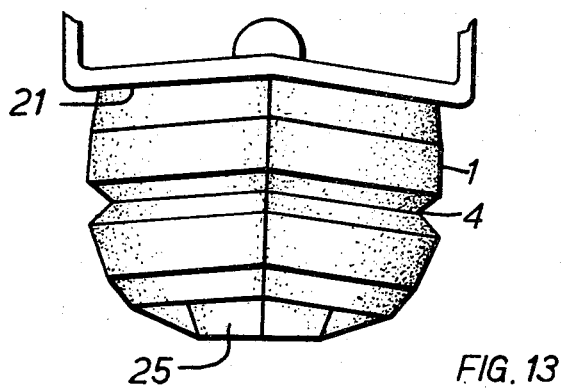
Figure 14:
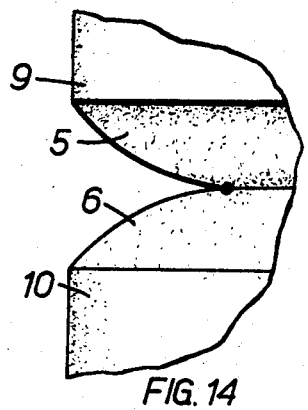
Figure 15:
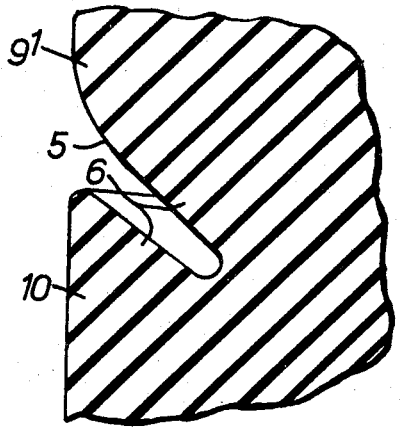
Figure 16:
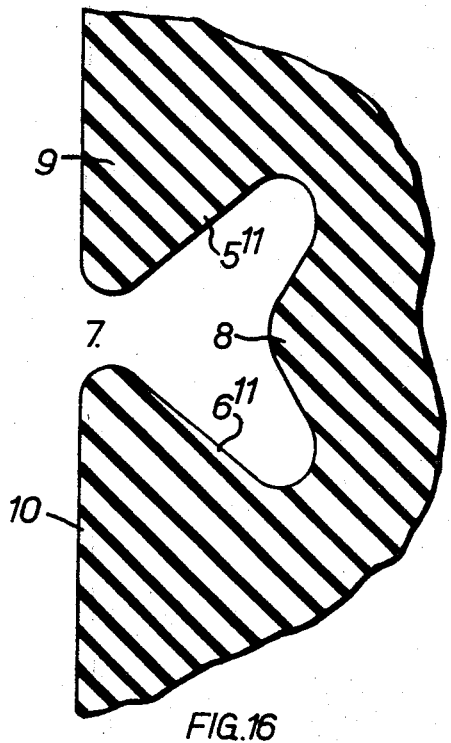
Figure 17:
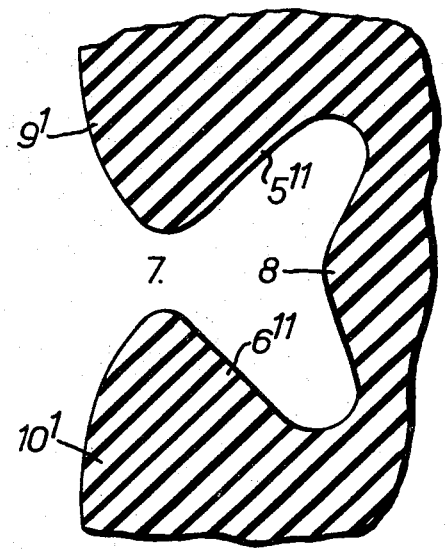
Figure 18:
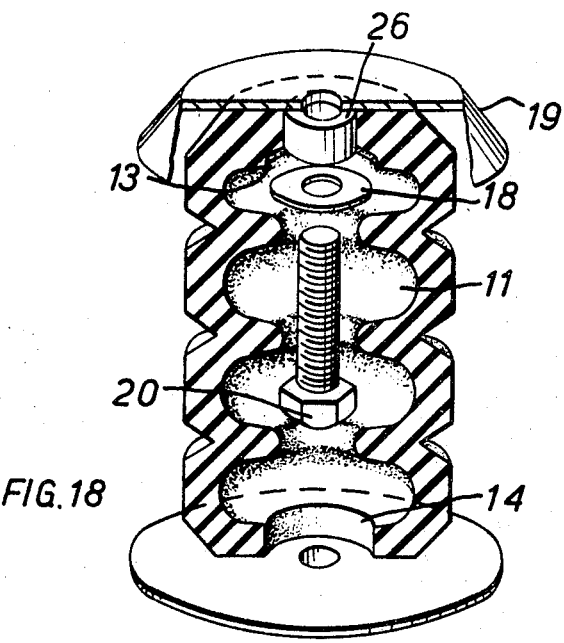
Figure 21:
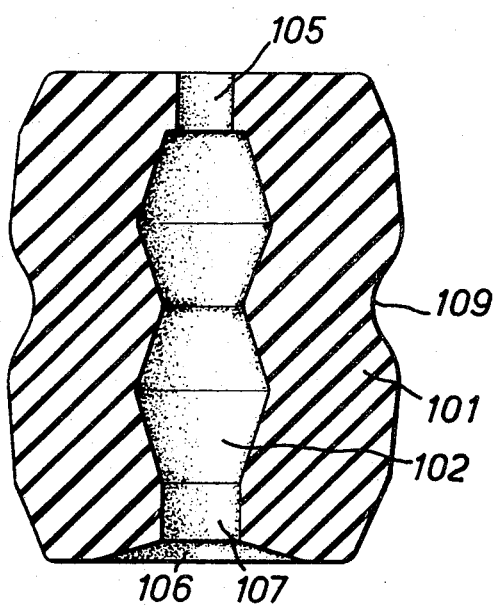
Figure 19:
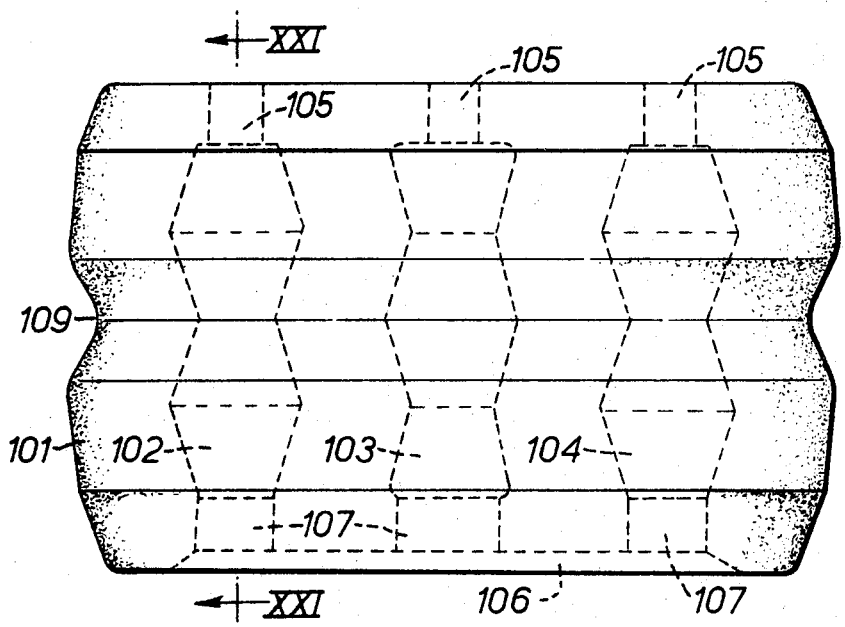
Figure 20:
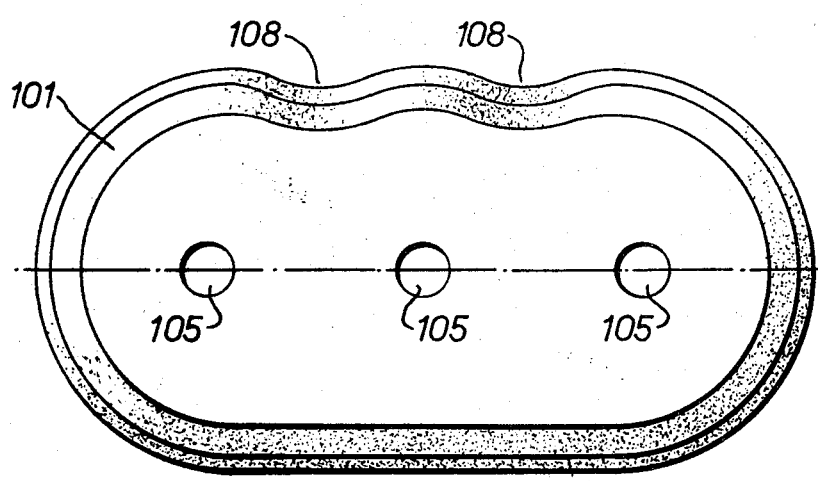

FIG. 13 is an elevation view of a spring body similar to the body shown in FIG. 12, but in which the upper surface of the spring body is of roof-like shape and is mounted in a correspondingly shaped chassis part of the vehicle so that longitudinal forces can also be reliably transmitted, the lower part of the spring body being of smaller surface area than the upper part, as a result of inclination of the side walls of the spring body and being provided with a projection having the shape of a truncated pyramid;

FIG. 14 is a fragmentary view showing a cross sectional shape of a constriction groove, the surfaces defining the opening angle of the groove being curved in such a manner that they approach each other asymptotically under loading;

FIG. 15 is a fragmentary view showing a cross sectional shape of a constriction groove, in which one of the surfaces defining the opening angle is curved and the other surface is flat;

FIG. 16 is a fragmentary view showing the cross sectional shape of a constriction groove, the groove being of generally dovetailed shape, the side wall adjacent to the groove being flat;

FIG. 17 is a fragmentary view showing the cross sectional shape of a further constriction groove, the groove being essentially of dovetailed form, but the side walls adjoining the groove being curved;

FIG. 18 is a side view, partly in section, showing the provision of a mounting bush at one end of a rubber spring;

FIG. 19 is an elevation of a spring body having three cavities;

FIG. 20 is a plan view of the spring body of FIG. 19 the upper half of the figure showing a modification; and FIG. 21 is a cross sectional view along the line XXI—XXI of FIG. 19.

Referring to the drawings, an oblong block shaped rubber spring body 1 is provided with rounded off ends 2. The transition from the side surfaces and end edge surfaces to the end faces is effected by means of a bevel 3. The exterior of the spring body is provided with one or more constriction grooves 4. The side faces 5 and 6 of these grooves may be arranged at an angle to each other, the grooves then being substantially of V shape. The grooves may however be of curved cross section as shown in FIG. 14 or may have a cross sectional shape based on a combination of curved and flat surfaces as shown in FIG. 15, the flat surface being indicated by reference numeral 6′ whereas the other surface 5′ is in the form of a smooth curve. The grooves may also be of generally dovetailed form as shown in FIG. 16, the surfaces 5″ and 6″ converging outwardly at an angle to each other, so that at the outside of the spring body only a narrow opening 7 can be seen. At the base of the groove a bulging portion 8 is formed. The wall portions of the spring body, adjacent to the constriction groove are indicated by reference numerals 9 and 10 and for the embodiment shown in FIG. 16 are flat. In the embodiment shown in FIG. 17, the constriction groove is likewise of dovetailed shape but the wall portions 9′ and 10′ adjoining the groove are curved.

For increasing the loadability and for influencing the spring action so as to achieve uniform deformation of the spring body, the opening angle of the constriction groove may be different at different peripheral points on the spring body. For example, in one advantageous form as shown in FIG. 4, the opening angle is made smaller at the longitudinally extending regions of the constriction groove than at the transversely extending regions. As a result of the more rapid deformation at the transversely extending regions, if the opening angle were made uniform for all regions of the constriction groove, the constriction groove would close more rapidly at the transversely extending regions. By making the opening angle greater at the transversely extending regions, that is to say at the narrow ends of the spring body, a more favourable deformation characteristic can be obtained.

A favourable internal deformation of the spring body is obtained by the provision of two or more cavities within the oblong spring body. As can be seen from FIGS. 2 and 3, it is advantageous for the cavities to be in the shape of superposed truncated cones. Referring to FIG. 2, a spring body is shown having an external constriction groove formed with walls 5 and 6, the body having a cavity 11. Since the spring body is of oblong configuration, it will be provided with a plurality of such cavities, disposed in a row, as can be seen from FIG. 1 and FIG. 3. The cavities may be arranged in a row, coincident with the longitudinal axis of the spring body, although they may however be staggered with respect to the longitudinal axis. At one end, each cavity 11 is provided with a small opening 12, and at the other end with a larger opening 14. At the end having the small opening 12, a step 13 is formed which serves for receiving a flanged head of a mounting bolt.

As shown in FIG. 18, the opening 12 which communicates with the cavity 11 may have a metal retaining bush 16 vulcanised therein, the bush 26 serving for receiving the mounting bolt 17. It will be understood that although the step 13 in the rubber body may directly receive the head of the bolt 20, preferably a washer 18 is interposed, as shown in FIG. 18. The bolt 20 may serve to hold the spring body in engagement with a metal cup 19 and with the chassis of the vehicle. The larger opening 14 at the lower end of the rubber body is sufficiently large to enable passage of the washer 18 and bolt 20 therethrough. It will be noted from FIGS. 1 and 3 that for alternate cavities 11 the openings 12 and 14 are provided at alternate ends. Thus, as viewed in FIG. 3, two openings 12 are provided at the top of the rubber body and two openings 12 at the bottom thereof. Accordingly, the possibility is given of securely mounting the rubber body by both of its ends.

For improving the deformation characteristics of the outer wall of the spring body, the outer wall may be provided with inwardly curved regions 15 as shown in FIGS. 9 and 10 and regions 108 as shown in the upper half of FIG. 20. These inwardly curved regions 15 or 108 are advantageously disposed between two of the cavities 11.

As a further means for influencing the deformation characteristics and for increasing the stability, the constriction groove 14 which extends around the periphery of the spring body may have a zig-zag shape or a wave shape or a tooth-like shape as illustrated respectively in FIGS. 5, 6 and 7. An especially favourable form is shown in FIG. 8, in which the constriction groove does not extend medially around the rubber body but has portions which meet at an obtuse angle at the centre of the end face. It will be understood of course that regardless of the shape of the path along which the constriction groove extends, the groove itself may have any desired cross sectional shape.

Figure 11:
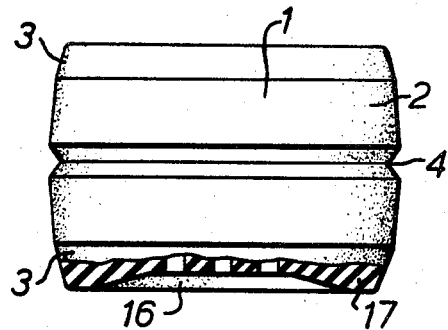
FIG. 11 is an elevation view of a spring body in which the lower end surface has a deformable margin.

In the spring body 1 shown in FIG. 11, for increasing the spring deflection path and for achieving a very shallow initial portion of the spring characteristic line, a key-like recess 16 is provided at the lower end face of the spring body. This leaves a narrow rim 17 at the end face of the spring body, the rim being the first region of the spring body to deform when a load is applied, as a result of its low specific cross section. This ready deformability results in a very shallow initial portion of the spring characteristic line. The key-shaped recess 16 has a stabilising and centralising action since to a certain extent it results in a suction action holding the spring body against the lower support.

In the embodiment shown in FIG. 12 the upper and lower end faces 21 and 22 of the spring body are of V-shape. Accordingly, these end faces can be considered as surface portions which meet each other at an inclination at the centre of the respective face. The upper end face in FIG. 12 is secured to a correspondingly roof-shaped chassis part 23 of the vehicle, the part 23 thus serving as a support for the spring. The lower end face 22 is of roof shape and cooperates with a flat plate carried by the vehicle axle. During springing action, the apex of the lower end of the rubber spring first engages the flat plate. This construction of the spring body ensures a satisfactory transmission of longitudinal and guiding forces and also ensures a gently rising spring characteristic line since the lower end of the spring body first makes line contact with the supporting surface, therefor, and then progressively deforms. Advantageously, a flattened region 24 is provided at the apex of the lower surface of the spring body, so that the lower end of the spring body does not make a knife edge-like contact with the supporting plate, as a result of which it would be subjected to greater wear. In this embodiment, similarly to the embodiment shown in FIG. 11, a key-way like recess 16 may be provided so as to establish a rim 17 which assists in the provision of a gently rising spring characteristic.

In the embodiment of FIG. 13 the rubber spring body is similar to that shown in FIG. 12. However, the upper end 21 is the larger of the two ends of the spring body and is of roof-like shape, the end 21 being in engagement with a bracket on the vehicle chassis, the bracket having a V-shaped depression for receiving the roof-like end 21 of the spring body. The narrow end of the spring body is downwardly directed and is provided with a projection 25 having the shape of a truncated pyramid, this serving for engaging a mounting plate carried by the vehicle axle.

In the embodiment of FIGS. 19, 20 and 21, the spring body is generally similar to that shown in FIG. 3, but the cavities are differently arranged. The spring body 101 has three cavities 102, 103 and 104 which at one end open to the top of the spring body, as viewed in FIG. 19, by openings 105 and at the other end open to a recess 106 in the lower face of the spring body by openings 107.

As seen in the upper half of FIG. 20, the outer wall of the spring body 101 has inwardly curved regions 108 so disposed that the outer wall has portions approximately concentric with the cavities. Alternatively, as shown in the lower half of FIG. 20, the outer wall of the spring body may be flat.

The outermost two of the cavities 102 and 104, have a similar shape to the cavities 11 of the embodiment of FIG. 3 but the central cavity 103 is so shaped that the thickness of rubber between the cavity 103 and the cavity 102 or the cavity 104 is the same over the entire height of the cavity. Thus it will be seen that in the embodiment of FIG. 3 the rubber between successive cavities 11 is waisted twice, whereas in the embodiment of FIGS. 19, 20 and 21 the rubber between adjacent cavities has a zig-zag configuration without being waisted.

Just as in the embodiment of FIG. 3, a constriction groove 109 extends around the spring body, the groove 109 having a rounded bottom rather than the angular bottom of the groove 4 of FIG. 3.

I claim:
1. A spring for damping and absorbing shocks and vibrations, said spring comprising an oblong body of elastomeric material having substantially flat side surfaces, generally rounded end surfaces, and oppositely disposed engaging faces, at least one constriction groove extending around said body and having two faces which approach each other on compression of said body, and a plurality of cavities having axes extending transverse to said engaging faces and being spaced in longitudinal direction of the body from each other, each cavity having at least one portion of double frusto-conical form with the bases of each double conical portion coinciding and arranged in such a manner that the conical surfaces defining the cavity approach each other on compression of the body.

2. A spring body as claimed in claim 1, wherein bores for receiving mounting bolts extend from the cavities to the said oppositely disposed faces, the bores of successive cavities opening alternately onto one or the other of the said oppositely disposed faces.

3. A spring body as claimed in claim 1 wherein the cavities are so disposed that their longitudinal axes are parallel to each other and that the axes of successive cavities lie alternately to one or the other side of a central plane through the body.

4. A spring body as claimed in claim 1, wherein the side surfaces of the body are contoured so as to provide a depression between each two cavities.

5. A spring body as claimed in claim 1, wherein the constriction groove is of generally angular cross section and presents a smaller opening angle at the side surfaces of the body than at the end surfaces.

6. A spring body as claimed in claim 1, wherein the constriction groove has curved sides, in cross section, which adjoin straight portions of the side and end surfaces of the body.

7. A spring body as claimed in claim 1, wherein the constriction groove, in cross section, has one curved side and a straight side which extends at an inclination to the periphery of the body such that it forms with said periphery an acute angled lip-like portion.

8. A spring body as claimed in claim 1, wherein the constriction groove is of generally dovetailed cross section, the base of the dovetail being concave, considered in the direction from the interior of the body to the groove.

9. A spring body as claimed in claim 8, wherein the constriction groove adjoins portions of the side and end surfaces of the body which are straight, considered in a direction parallel to the axis of the cavity or cavities.

10. A spring body as claimed in claim 8, wherein the constriction groove adjoins portions of the side and end surfaces of the body which are curved, considered in a direction parallel to the axis of the cavity or cavities.

11. A spring body as claimed in claim 1, wherein the constriction groove follows a zig-zag path around the body.

12. A spring body as claimed in claim 1, wherein the constriction groove follows an undulating wave-shaped path around the body.

13. A spring body as claimed in claim 1, wherein at least one of the grooves, has a chevron-like discontinuity therein.

14. A spring body as claimed in claim 1, wherein at least one of the said oppositely disposed faces has a trough-like recess surrounded by a deformable marginal portion of the body.

15. A spring body as claimed in claim 17, wherein said one of the said oppositely disposed faces is adapted for mounting the body and the other is provided with a truncated tapering projection.

16. A spring body as claimed in claim 1, wherein transition regions from the side and end surfaces of the body to the said oppositely disposed faces are levelled.

17. A spring body as claimed in claim 1, wherein at least one of said oppositely disposed faces has a pair of face portions inclined with respect to each other at an obtuse angle.

References Cited

FOREIGN PATENTS 1,036,035  8/1958  Germany.
1,157,837  1/1958  France.

ARTHUR L. LA POINT, *Primary Examiner.*

R. M. WOHLFARTH, *Assistant Examiner.*